US006790351B2

(12) United States Patent
Xia et al.

(10) Patent No.: US 6,790,351 B2
(45) Date of Patent: Sep. 14, 2004

(54) VERTICAL FILTER (75) Inventors: Yongming Xia, Kingwood, TX (US); James E. Thompson, The Woodlands, TX (US); Jeffrey S. Devine, The Woodlands, TX (US)

(73) Assignee: Ashbrook Corporation, Houston, TX (US)

( * ) Notice: Subject to any disclaimer, the term of this patent is extended or adjusted under 35 U.S.C. 154(b) by 0 days.

(21) Appl. No.: 10/664,765

(22) Filed: Sep. 17, 2003

(65) Prior Publication Data

US 2004/0050762 A1 Mar. 18, 2004

Related U.S. Application Data (62) Division of application No. 10/237,554, filed on Sep. 9, 2002, now Pat. No. 6,641,737, which is a continuation-in-part of application No. 09/966,317, filed on Sep. 27, 2001, now Pat. No. 6,517,712, which is a division of application No. 09/553,511, filed on Apr. 20, 2000, now Pat. No. 6,319,413.

(51) Int. Cl.[7] .............................................. B01D 24/46
(52) U.S. Cl. ........................ 210/189; 210/268; 210/274; 210/786; 210/794
(58) Field of Search ................................ 210/189, 268, 210/274, 676, 678, 786, 794

(56) References Cited

U.S. PATENT DOCUMENTS

| 650,611 | A | 5/1900 | Reeves |
|---|---|---|---|
| 800,113 | A | 9/1905 | Kassian |
| 1,565,233 | A | 12/1925 | Bernsten |
| 2,057,887 | A | 10/1936 | Elliott et al. |
| 2,073,388 | A | 3/1937 | Elliott et al. |
| 2,468,838 | A | 5/1949 | Rey |
| 3,537,582 | A | 11/1970 | Demeter |
| 3,563,385 | A | 2/1971 | Bykov |
| 3,598,235 | A | 8/1971 | Demeter |
| 3,667,604 | A | 6/1972 | Lagoutte |
| 3,767,048 | A | 10/1973 | Prengemann |
| 4,052,300 | A | 10/1977 | Mosso |
| 4,060,484 | A | 11/1977 | Austin et al. |
| 4,126,546 | A | 11/1978 | Hjelmner et al. |
| 4,246,102 | A | 1/1981 | Hjelmner et al. |
| 4,340,485 | A | 7/1982 | Ikeda et al. |
| 4,399,034 | A | 8/1983 | Moller |
| 4,707,252 | A | 11/1987 | Durot et al. |
| 4,720,347 | A | 1/1988 | Berne |
| 4,861,472 | A | 8/1989 | Weis |
| 4,891,142 | A | 1/1990 | Hering, Jr. |
| 4,900,434 | A | 2/1990 | Schade |
| 5,154,824 | A | 10/1992 | Anderson |
| 5,173,194 | A | 12/1992 | Hering, Jr. |
| 5,277,829 | A | 1/1994 | Ward |
| 5,454,959 | A | 10/1995 | Stevens |
| 5,462,654 | A | 10/1995 | Hering, Jr. |
| 5,520,804 | A | 5/1996 | Ward |
| 5,543,037 | A | 8/1996 | Hering, Jr. |
| 5,582,722 | A | 12/1996 | Wachinski et al. |
| 5,681,472 | A | 10/1997 | Jonsson et al. |
| 5,698,106 | A | 12/1997 | Larsson et al. |

(List continued on next page.)

Primary Examiner—Robert James Popovics
(74) Attorney, Agent, or Firm—Jeffrey L. Wendt (57) ABSTRACT A liquid filtering apparatus is placed in a vessel having a bed of filtration material and an intake for introducing unfiltered liquid, that includes a washbox, an airlifting tube extending from the washbox and including an intake end and means for introducing a primary gas to the airlifting tube, the airlifting tube passing through a central pipe, which extends from just below the washbox to a position just above the intake end. At least one screen cartridge is oriented in a generally angular downward direction in the bed and is in communication with an effluent chamber defined in part by the outer surface of the central pipe. A reject line extends from the washbox, and an effluent collector extends from the effluent chamber. A method of filtering and cleaning the filtration material is also disclosed.

29 Claims, 6 Drawing Sheets

U.S. PATENT DOCUMENTS

| | | |
|---|---|---|
| 5,730,886 A | 3/1998 | Wachinski |
| 5,746,913 A | 5/1998 | Chang et al. |
| 5,755,959 A | 5/1998 | Jonsson et al. |
| 5,895,567 A | 4/1999 | Van der Herberg |
| 6,035,892 A | 3/2000 | Kennedy |
| 6,077,426 A | 6/2000 | Grabowski |
| 6,143,186 A | 11/2000 | Van Unen |
| 6,319,413 B1 | 11/2001 | Xia et al. |
| 6,364,179 B1 | 4/2002 | Sullivan |
| 2002/0036164 A1 | 3/2002 | Xia et al. |
| 2003/0066792 A1 * | 4/2003 | Xia et al. .................. 210/189 |

* cited by examiner

VERTICAL FILTER

CROSS-REFERENCE TO RELATED APPLICATION

This application is a divisional of U.S. patent application Ser. No. 10/237,554, filed Sep. 9, 2000 now U.S. Pat. No. 6,411,737, and entitled "Vertical Filter," which is a continuation-in-part of U.S. patent application Ser. No. 09/966,317, filed Sep. 27, 2001 now U.S. Pat. No. 6,517,712, and entitled "Vertical Filter" which is a divisional of U.S. patent application Ser. No. 09/553,511, filed Apr. 20, 2000, now U.S. Pat. No. 6,319,413, and entitled "Method of Filtering Liquid Using a Vertical Filter," both of which are herein incorporated by reference.

BACKGROUND OF THE INVENTION

1. Field of the Invention

This invention relates to an apparatus and method for filtering liquids containing suspended solids. Specifically, this invention relates to an improved vertical filtration unit.

2. Description of Related Art

The removal of suspended solids from liquids, especially water, has been a longstanding requirement for many uses of such liquids. For example, water, which is free of suspended solids, is greatly preferred for uses, such as drinking, industrial processing, and swimming pools. Vertical filters, which utilize filter media, such as sand, have been used to separate suspended solids from water.

Vertical filters operate by introducing the liquid containing suspended solids onto the top portion of a bed of filter media, usually sand. As the liquid passes through the filter media under the force of gravity, the suspended solids adhere to the filter media, allowing liquid free of suspended solids to accumulate and exit from the bottom of the vertical filtration unit.

The above-described method, although effective at removing suspended solids from liquids, has several shortcomings. The filter media eventually becomes saturated with suspended solids and no longer effectively removes suspended solids from the incoming liquid. When this condition occurs, the vertical filtration unit must cease operation so that the captured suspended solids can be removed from the filter media. This removal is accomplished through an operation referred to as "backwashing," in which clean liquid is introduced, under pressure, to the bottom of the filter media bed and passes through the filter media in the reverse direction from the filtration process. The reverse flow of the liquid removes the filtered solids from the filter media and exits through the top of the vertical filter. This operation is typically continued until the exiting backwash water is free of suspended solids, indicating that the filter media is clean.

Backwashing can be very time consuming and generates large volumes of wastewater. Additionally, filtered solids are never completely removed from the filter media during backwashing, which eventually results in the filter media needing to be replaced. Filtration devices utilizing the above method are disclosed in U.S. Pat. No. 650,611.

The problem of backwashing filter media has been addressed, to some extent, through the development of continuous or moving bed filtration systems. While these continuous filtration systems operate to remove suspended solids as outlined above, they have the added benefit of continuously removing filtered suspended solids from the filter media. In these methods, the dirtied filter media at the bottom of the vertical filter unit and a small amount of filtered water are airlifted to a washbox. This lifting is carried out by an airlift tube equipped with a compressed air supply. The mixture of filtered water, filtration sand, and suspended solids is directed against a baffle or plate to scrub the suspended solid particles from the sand.

The washed sand is returned to the top of the filter media bed. The suspended solid particles, which are washed from the filter media, are flushed from the filter by a combination of filter effluent liquid and filtered liquid that carry the suspended solids across a reject weir and out of the vertical filtration unit. The filtration cycle automatically repeats itself with the influx of a new supply of liquid to be filtered.

Examples of the above-described continuous filtration systems are disclosed and explained in U.S. Pat. Nos. 4,060,484; 4,891,142; and 5,582,722, all of which are herein incorporated by reference.

Conventionally, filtered effluent is removed by way of exit pipes that require cutting holes into a filter vessel or concrete basin. This can create difficulties and inconveniences when existing basins, with no pre-existing holes, are retrofitted for filtration use. It is desirable in many cases to not bore holes in the side of such basins.

The above-described continuous systems for the filtration of liquids and the removal of suspended solid particles are typically not as effective or efficient as industry and the public's need and desire. These systems typically require level sensors and valve actuators, which are expensive and fail when electrical power supply is lost. Many valves are often required which can cause confusion for those operating the filtration unit. The airlifting operation often "plugs" with filter media, causing the filtration unit to be shut down for cleaning. There remains an unmet need to provide a reliable, maintenance-free, continuous, self-cleaning, vertical filtration unit for the removal of suspended solids from liquids that may be retrofitted to existing basins with no requirement for boring holes into the basin.

SUMMARY OF THE INVENTION

The present invention is directed to a liquid filtering apparatus that includes a washbox, an airlifting tube, a central pipe, an effluent riser pipe, an effluent chamber, at least one screen cartridge in communication with a lower portion of the effluent chamber, a reject outlet pipe communicating the washbox with a reject box, and an effluent collector communicating the effluent chamber with a location outside of the liquid filtering apparatus.

The airlifting tube extends from the washbox and includes an expulsion end within the washbox and an intake at a lower end, opposite from the washbox. The central pipe extends along an outside surface of the airlifting tube from a position just below the washbox to a position just above the intake end. The effluent riser pipe extends along an outside surface of the airlifting tube from a position just below the washbox to a position above the intake end. The effluent chamber is defined by the outer surface of the central pipe, a bottom plate of the effluent riser pipe, an upper plate of the effluent riser pipe, and an inner surface of the effluent riser pipe. The at least one screen cartridge is oriented in a generally angular, downward direction.

Generally, the liquid filtering apparatus is placed in a vessel having a bed of filtration material and an intake for introducing unfiltered liquid into an upper region of the vessel. The vessel may be a pre-existing vessel to which the liquid filtering apparatus is retrofitted.

The present invention is also directed to a method of filtering liquid. The method includes the steps of: (a) placing a liquid filtering apparatus in a vessel having a bed of filtration material and introducing unfiltered liquid into an upper region of the vessel; (b) filtering the unfiltered liquid through the bed in a downward direction; (c) collecting filtered liquid in at least one screen cartridge and conveying the filtered liquid upward into an effluent chamber; (d) removing the filtered liquid from the effluent chamber by way of an effluent collector; (e) withdrawing a mixture of filtered liquid and dirtied filtration material from a lower portion of the bed of filtration material by way of an airlifting tube; (f) washing the dirtied filtration material by deflecting the mixture off of a surface and separating the dirt from the filtration material; (g) collecting the dirt and liquid separated in step (f) and removing it by way of a reject line; and (h) depositing the washed filtration material to the top of the bed of filtration material.

The present invention is further directed to a liquid filter assembly wherein two or more of the liquid filtering apparatuses described above are included.

DETAILED DESCRIPTION OF THE PREFERRED EMBODIMENTS

In the following description and accompanying drawings, like reference numbers, as used in the various figures, refer to like features or elements. Terms, such as upper, lower, inner, and outer, refer to the orientation of a given element as shown in the drawings.

Various numerical ranges are disclosed in this patent application. Because these ranges are continuous, they include every value between the minimum and maximum values. Unless expressly indicated otherwise, the various numerical ranges specified in this application are approximations.

Figure 1:
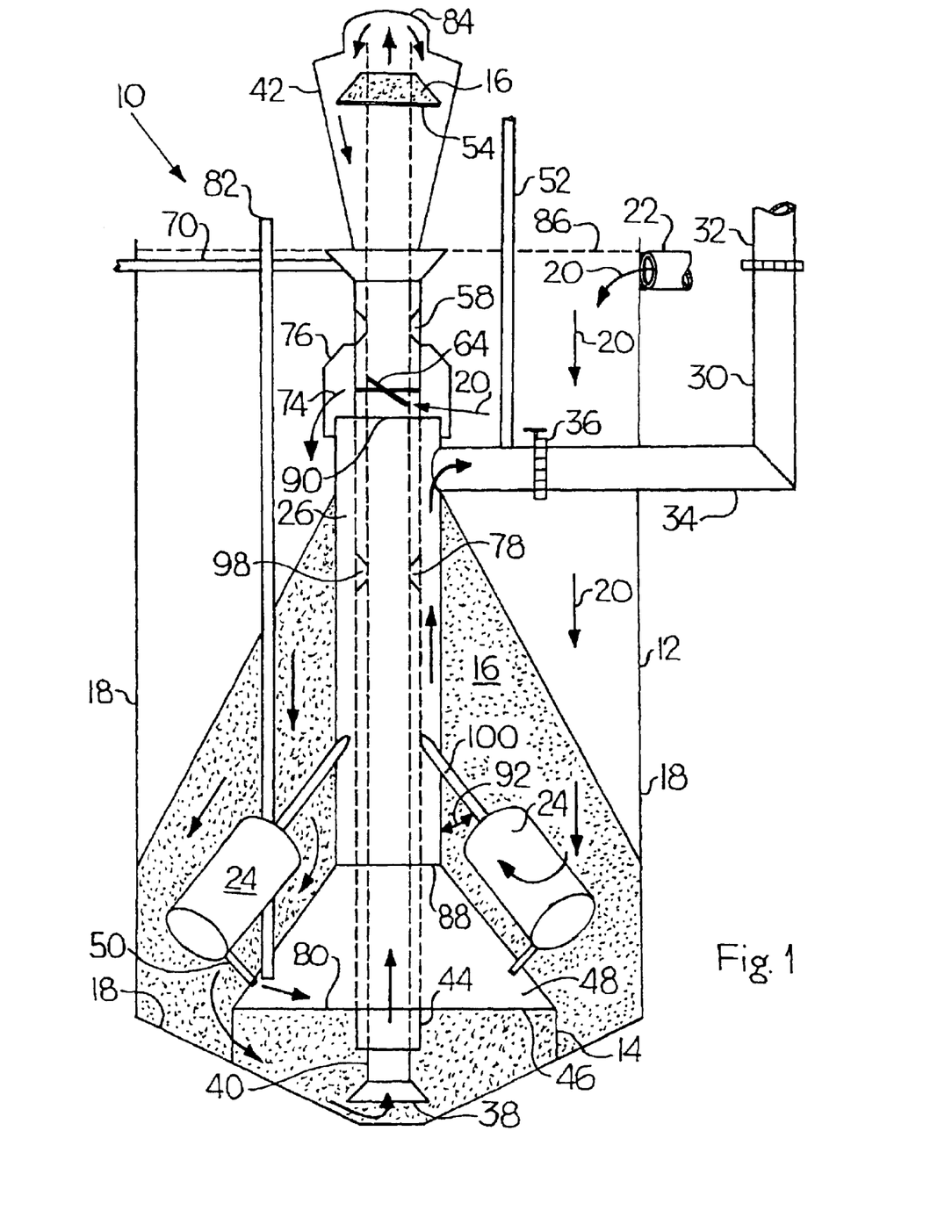
FIG. 1 is a schematic elevation view of the present invention showing internal components.

Referring to FIG. 1, filter unit 10 includes a vessel 12, which is defined by sidewalls 18. While the vessel 12 is depicted as cylindrical in cross section, it may be square or some other cross-sectional configuration. Vessel 12 contains a bed of particulate filter media 16, which may be sand, anthracite, ceramic beads, granular activated carbon, or another suitable filtration material. The filter media 16 may be classified prior to being placed in vessel 12. If filter media particles that are too fine are included, liquid flow through the bed can be impeded. If filter media particles are too large, the internal parts can be damaged. It is preferred that the filter media particle size is less than 0.125 inches.

Filter media bed 16 may have a double tapered conical shape and an unfiltered liquid 20 descends downwardly through the filter media bed 16. Enhanced filtration is accomplished if the particle size of the filter media bed 16 is coarser, or larger at the outer area, becoming finer, or smaller toward the middle and center of the filter media bed 16.

The upper conical configuration of the filter media bed 16 occurs naturally from the operation of the filtration unit. As the filter media drops from a washbox 42 onto the top of the conical pile, the particles classify themselves. The larger filter media particles tend to roll down the slope of the cone. The smaller particles, however, tend to descend vertically through the interior of the cone portion. This action results in the preferred, natural conical configuration of the pile.

The filtration process begins with the entry of the unfiltered liquid 20 into the vessel 12 through an influent liquid intake 22. The unfiltered liquid descends, due to gravity, through the conical filter media bed 16, toward the bottom of the filter. The unfiltered liquid may be any liquid but will typically be water or wastewater. The liquid intake 22 is located in sidewall 18 at a point above the media bed, but not so high as to be above the liquid level 86, which would cause splashing and air entrainment. Liquid intake 20 may be positioned horizontally and tangent to the tank wall to impart a circular motion to the unfiltered liquid. This avoids stagnant zones and keeps floating material from sticking to sidewalls 18.

The unfiltered liquid 20 tends to flow through the coarser outer layer rather than through the finer inner layer. Liquids typically follow the path of least resistance. The path of least resistance in this case is through the coarse particle size filter media because the space between particles is large compared to the finer filter media. Thus, the initial filtration of unfiltered liquid 20 is accomplished by the coarse particle size filter media.

The partially filtered liquid is further filtered as it next flows through the interior layer of finer particle size filter media. The liquid then flows through multiple cartridge screens 24, which may be cylindrically shaped, to an effluent chamber 26, which collects the filtered liquid.

In the present filter unit, a central pipe 44 extends along an outside surface of an airlifting tube 40 from a position just below the washbox 42 to a position just above the intake end 38 of airlifting tube 40. An effluent riser pipe 98 extends along an outside surface of central pipe 44 from a position just below washbox 42 to a position above intake end 38. Effluent chamber 26 is defined by the outer surface of central pipe 44, a bottom plate 88 of effluent riser pipe 98, an upper plate 90 of effluent riser pipe 98, and an inner surface of effluent riser pipe 98. At least one screen cartridge 24 is in communication with a lower portion of effluent chamber 98. The screen cartridge 24 is oriented in a generally angular downward direction.

The cartridge screens 24 surround effluent chamber 26. There must be a sufficient number of cartridge screens 24 to surround effluent chamber 26. A sufficient number of cartridge screens 24 may be two, in some cases three, in other cases four, in some instances five, in other instances six, and in some situations ten. The number of cartridge screens 24 can vary between any of the recited numbers from two through ten. Typically, at least five cartridge screens are used. Preferred cartridge screens are pipe-based screens with end caps, as sold by Tate Andale of Ontario, Canada. The filtered effluent liquid leaves the filtration unit through effluent collector 34 to external exit riser pipe 30. Effluent value 36 can be used to control or stop the flow of liquid through effluent collector 34. The exit riser pipe 30 discharges to an area external from the filter unit. The rate of flow through effluent collector 34 is controlled by a telescoping valve 32 on exit riser pipe 30. Any suitable telescoping valve may be used for telescoping valve 30. Suitable telescoping valves include, but are not limited to, those disclosed in U.S. Pat. Nos. 6,364,179 to Sullivan and 6,035,892 to Kennedy, both of which are herein incorporated by reference.

The solids captured by the filter media bed 16 are drawn downward with the moving filter media bed 16 into an intake end 38 area of airlift 40. The continuous transport of dirtied filter media from the bottom of the filter to washbox 42 is carried out by airlift 40. The performance of the filter unit depends, in great part, on the performance of the airlift. Airlifts themselves are well known in the fields of wastewater treatment and well hydraulics. A conventional airlift pump consists essentially of a vertical tube having its lower end submerged in a liquid or slurry to be pumped. The upper end of the tube discharges the pump material. In the case of the present invention, the upwardly transported mixture of dirtied filter media and filtered liquid empties into the washbox 42. The height to which the mixture can be airlifted depends on the efficiency of the airlift system.

The actual pumping or lifting action is achieved by the introduction of air into the lower part of the airlift 40 which also contains a mixture of filtered liquid and dirtied filter media. The resultant mixture is lighter than the liquid in which the lower end is submerged. The upwardly directed pressure of the column of liquid in the base of the airlift 40 combined with lower specific gravity of the air, liquid, and filter media mixture inside the airlift 40 forces the mixture of dirtied filter media and filtered liquid upward. Any suitable airlifting means may be used in the airlifting tube 40 of the present invention. Suitable airlift means include, but are not limited to, those disclosed in U.S. Pat. Nos. 6,319,413 to Yia et al., 5,730,886 to Wachinski et al., and 5,582,722 to Wachinski et al., all of which are herein incorporated by reference. Intake end 38 may have a bell-shaped bottom to increase the pumping rate of the airlift. Thus, more filtered water, filter media, and dirt can be pumped to the top of the filtration unit without increasing the air supply requirement.

Figure 3:
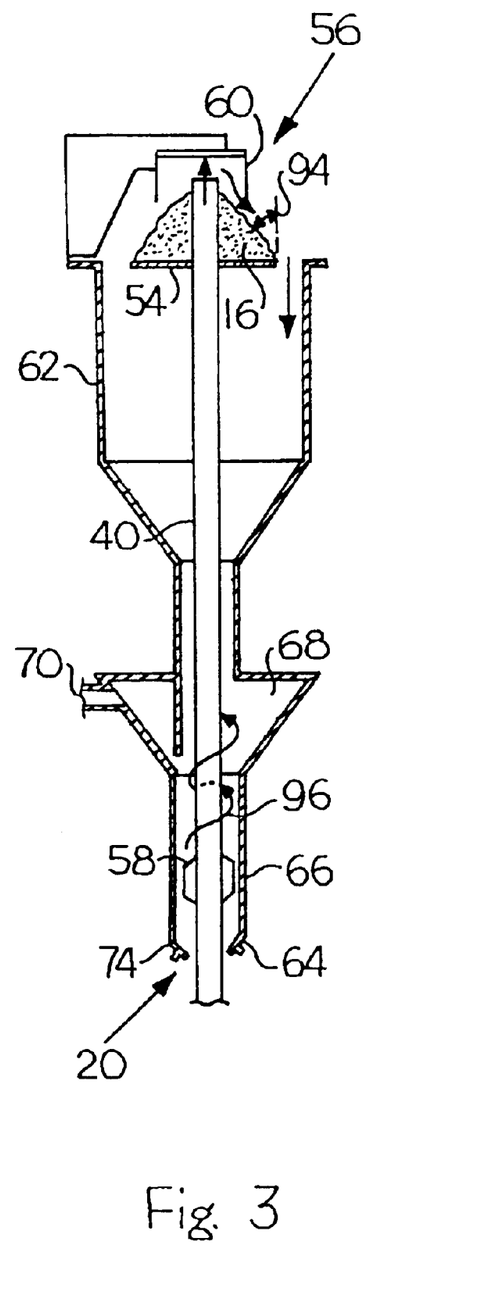
FIG. 3 is an isolation view of a one-stage cleaning washbox.

Any suitable washbox design may be used in filter unit 12. In an embodiment of the present invention, washbox 42 is a one-stage washbox 56 as shown in FIG. 3. In one-stage washbox 56, airlift 40 is centered within washbox 56 through the use of centering guides 58. The liquid-sand-air mixture rises through the airlift 40 and deflects from a filter media shield hood 60 (also called a splash cap) that directs the fluid back down into the washbox 56. A target plate 54 serves as a foreign object trap by virtue of the small gap between the edge of target plate 54 and washbox body 62. Media 16 piles up on target plate 54 and slowly flows over the edge of target plate 54 as more media 16 accumulates above an angle of repose 94. This pile of media 16 on target plate 54 absorbs the energy of the falling media and prevents degradation of the media and abrasive wear on the washbox body 62. All cleaning is accomplished by unfiltered liquid 20 that enters the washbox body 62 through inlet tubes 64. There can be any number of cleaning liquid inlet tubes 64. It is preferred that the inlet tubes 64 be proportionately spaced on the underside of a washbox skirt 66. Typically, there are three inlet tubes 64. The cleaning liquid inlet tubes 64 may alternatively be supplied, at least in part, with filtered liquid from effluent chamber 26.

The higher density filter media settles into the washbox skirt area 66. In this area, the unfiltered liquid flows up from the bottom of the washbox skirt 66 via inlet tubes 64.

Unfiltered liquid 20, or wash liquid, enters a washbox filter media liquid separation area 68 via inlet tubes 64; there is a pressure difference between the liquid level in vessel 12, and a reject outlet pipe 70. The action of this pressure differential urges the wash liquid out to reject outlet pipe 70 and provides automatic level control, eliminating the need for level sensors in the operation of the vertical filter of the present invention. The upward velocity of wash liquid keeps the lower density solids in suspension so they can be slurried and discharged to a reject box (not shown). This slurry of solids and liquid is transported to the reject box via the reject outlet pipe 70 (FIG. 1).

Due to its higher density, the filter media settles in the washbox skirt 66. The wash liquid thus flows upward through an increasingly settled area of filter media before it reaches the reject outlet pipe 70. The filter media is thus cleaned at the washbox skirt area 66 before settling back to the top of the filter media bed 16 via washbox isolator 74. The washbox isolator 74 may have a reducing, tapered portion at its lowermost point and reintroduces the filter media to the upper region of the filter media bed 16. A space is provided between top plate 90 of effluent riser pipe 98 and the washbox 42 (FIG. 1). The space is typically about 1 inch, but may be larger or smaller as required. The reintroduction of filter media maintains the generally conical configuration of the bed.

Figure 2:
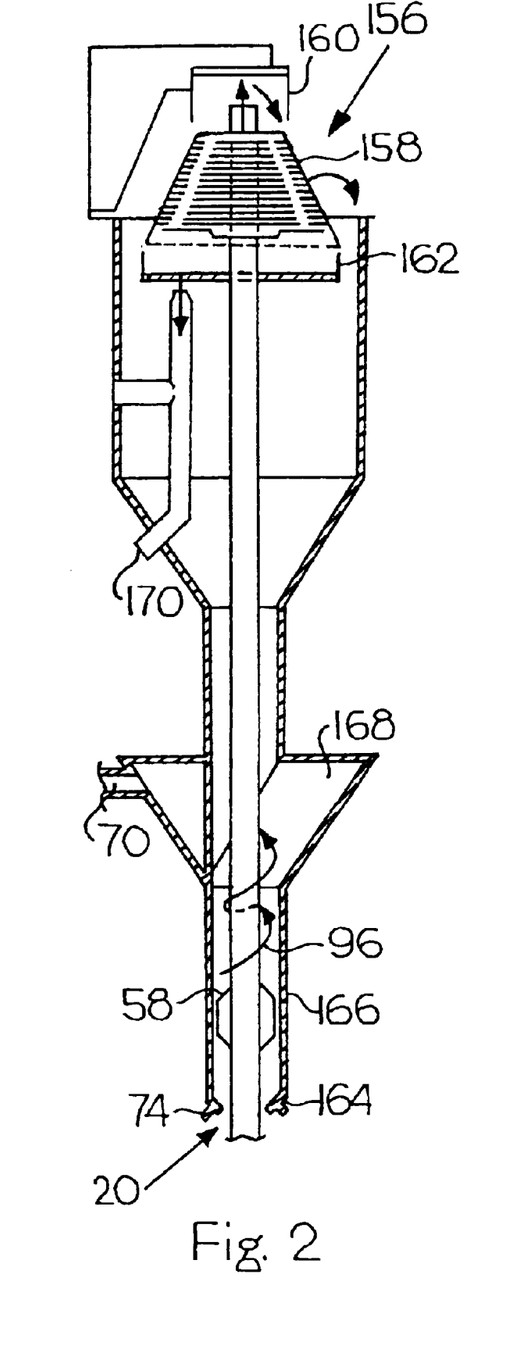
FIG. 2 is an isolation view of a two-stage cleaning washbox.

In an alternative embodiment, washbox 42 may be a two-stage cleaning washbox apparatus 156 as is depicted in FIG. 2. Two-stage cleaning washbox 156 includes a filter media shield hood 160 which deflects the filtered liquid and dirtied filter media downwardly onto a separation cone 158. This downward deflection efficiently washes dirt particles and solids from the filter media, along with the filtered liquid. The solids concentrated liquid from the airlift drops on the inclined porous surface of the separation cone 158 and passes through the surface of separation cone 158 into a dirtied liquid reject collecting tray 162. The separation cone 158 is constructed of a porous media or material. A woven, wedge wire construction is preferred for separation cone 158. The preferred wedge wire construction is such that the flat side of the wedge wire faces outward. The gap between the horizontally oriented wedge wire strands is up to 0.02 inches (0.5 mm). The concentrated dirtied liquid reject stream is piped by gravity through second reject line 170 to the reject box. This is the first wash stage.

The dewatered, partially cleaned, filter media moves down along the surface of the separation cone 158 and falls into a washbox filter media liquid separation area 168 and eventually into the washbox skirt 166 and is washed clean of filtered particles as described in the above-mentioned one-stage washbox 56 by unfiltered liquid, now wash liquid, entering into washbox skirt 166 via inlet tubes 164. The wash liquid is then carried away by the reject outlet pipe 70. This is the second wash stage. The wash liquid from reject outlet pipe 70 is then carried to the reject box where it is then removed from the filter unit.

The inlet tubes 64 or 164 allow the entry of unfiltered liquid 20 into washbox 42 where the sand being washed is falling through the rising unfiltered liquid 20. The inlet tubes 64 or 164 may be arranged tangentially to an outer circumference of washbox 42, which causes a circulating flow 96 that enhances the washing action. The unfiltered liquid being allowed into the washbox skirt 66 or 166 and separation area 68 and 168 above the bottom of washbox 42 does not impede the falling media that must exit out the bottom of washbox 42.

In one-stage washbox 56 or two-stage washbox 156, filter media shield hood 60 or filter media shied hood 160 may be an airlift return cap 84 as shown in FIG. 1. Airlift return cap 84 functions as the filter media shield hood, deflecting media, as described above.

Figure 4:
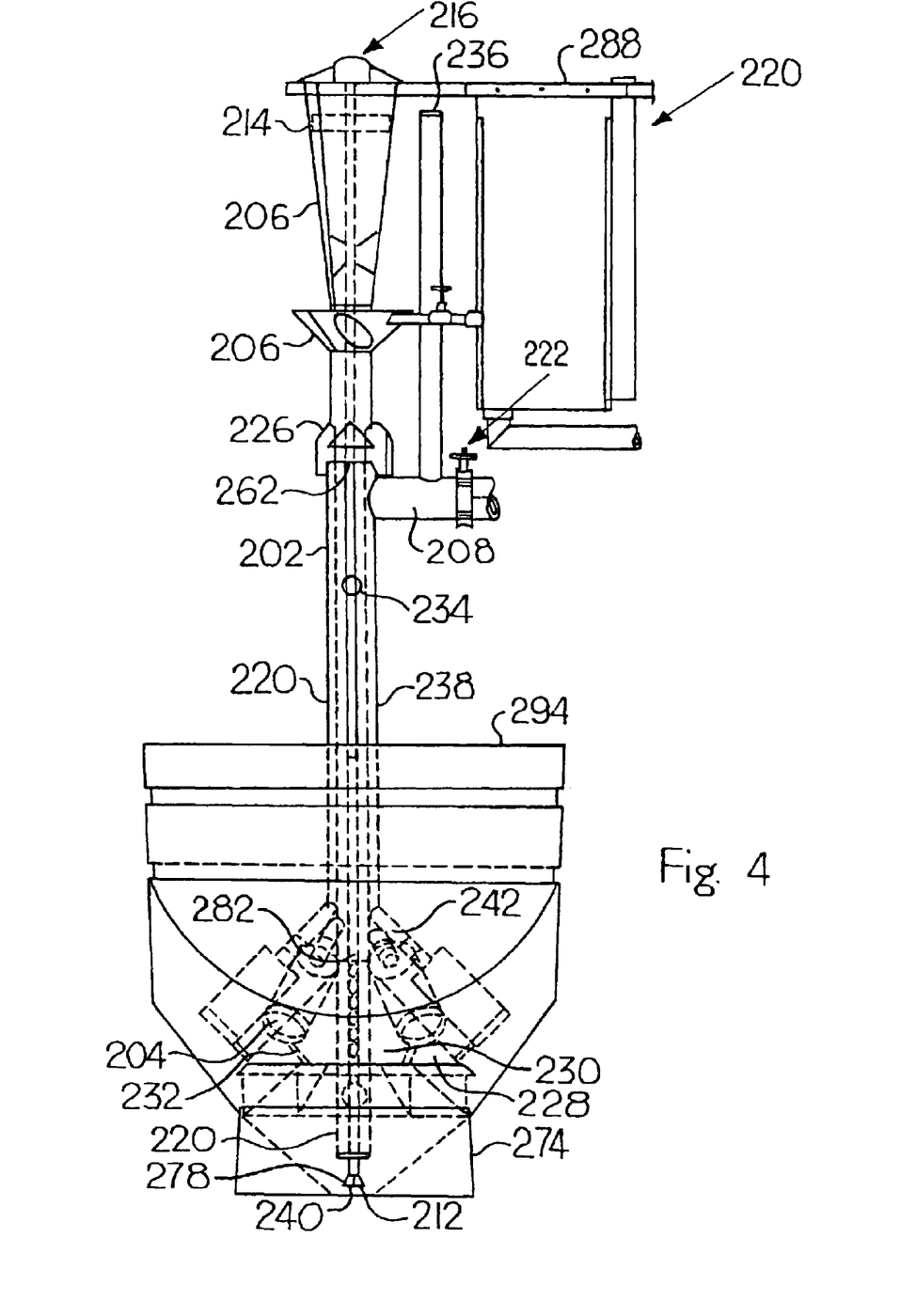
FIG. 4 is a schematic elevation view according to a second embodiment of the present invention showing internal components.

In a second embodiment of the present invention, the washbox 42 may be located above vessel 12. In this embodiment, as shown in FIG. 4, a filter unit 200, includes a liquid filtering apparatus 288 and has an effluent collector 208 located above cone 294, which eliminates the necessity for boreholes in the cone base. A washbox housing 206 includes either of one-stage washbox 56 or two-stage washbox 156 within its enclosure and is located above cone 294, which contains filter media. A one-stage washbox is shown in FIG. 4 and includes target plate 214. Liquid filtering apparatus 288 further includes a filtrate chamber 202 and an airlift return cap 216 as discussed above.

Filter unit 200 includes an airlifting tube 212 extending from just below airlift return cap 216 and includes an intake end 278 opposite from the end terminating at airlift return cap 216, which acts as the filter media shield hood. Airlifting tube 212 also includes a means for introducing a primary gas to the airlifting tube (not shown) and is enclosed within a central pipe 220 from just below washbox housing 206 to just above intake end 278. Filter unit 200 further includes an effluent riser pipe 238 extending along an outer surface of central pipe 220 from a position just below washbox housing 206 to a position above the intake end 278. Effluent chamber 202 is thus formed as defined by the outer surface of central pipe 220, a bottom plate 282 of effluent riser pipe 238, a top plate 262 of effluent riser pipe 238, and an inner surface of effluent riser pipe 238. Thus, the effluent from filter unit 200 is discharged through the space defined by centrally located concentric pipes 238 and 220. Air lift 212 is generally centered within central pipe 220. This center positioning is aided and maintained by way of one or more internal guide vanes 234, which are typically attached to air lift 212. An intake area 240, typically with a bell-type shape, is located at intake end 278 of air lift 212.

Effluent is removed from effluent chamber 202 by way of effluent collector 208. Effluent collector 208 has a back flush pipe 236, which may be used to clear the internal parts of filter unit 200 of debris as explained below. The flow of effluent in effluent collector 208 is controlled by way of valve 222. This configuration of this embodiment is advantageous in that it becomes easier to retrofit filter units in existing basins, such as cone 294, that have no installed piping. In this embodiment, there are no connections located in or covered by the filter media where they cannot be seen or maintained. Further, there is no need for coring holes in the walls of the containment structure to route pipes to the outside.

The washbox is contained within washbox housing 206, which may include either of one-stage washbox 56 or two-stage washbox 156. Washbox housing 206 is positioned in a generally centered location above effluent riser pipe 238 with the aid of internal guide vanes 234 and external guide vanes 226, which are attached to a lower portion of washbox housing 206.

At least one screen cartridge 204 is in communication with a lower portion of effluent chamber 202. Screen cartridge 204 may be fluidly connected to effluent chamber 202 by way of a cartridge connector 242. Screen cartridge 204 is oriented in a generally angular downward direction. By angular downward direction, what is meant is that screen cartridges 204 are not oriented perpendicular to effluent riser pipe 238, but form an angle 92 (as shown in FIG. 1) with effluent riser pipe 238. The angle 92 is less than 90°, in some cases less than 80°, in other cases less than 70°, in some instances less than 60°, and in other cases not more than 45°. The angular placement of the filter screens reduces the overall height of the filter unit 200, resulting in less overall cost of materials. The angular placement further reduces the maximum depth of the filter media 16 (resulting in less cost for media) and the lower hydraulic profile means that the filter unit 200 can be installed in more locations without the necessity of pumping.

Effluent riser pipe 238 generally terminates at a sand cone 228, which guides the flow of media 16 to the outside of cone 294 and controls the rate at which media 16 moves down through filter unit 200. Within sand cone 228 is a sand cone chamber 230 for any silt and fine media that may come into screen cartridges 204. Any fine and silt that come into screen cartridge 204 will settle to the bottom of screen cartridges 204, since the velocity inside screen cartridge 204 is much lower than it is at the screen cartridge 204/media 16 interface. In this case, silt tubes 232 connect the screen cartridge 204 to sand cone chamber 230 so that silt and fine media will be collected for later removal. The trapping of fine media and silt improves the performance of filter unit 200. This feature is not available in filter units that utilize vertical screen cartridges, where the effluent is taken out through an effluent chamber and the fine media and silt are swept out in the effluent where they reduce the quality of the filtered liquid.

Back flush pipe 236 is used to introduce a flow of air, liquid, and/or air-liquid mix to clean screen cartridges 202 by washing media particles from between the wedge wires in screen cartridges 202. The back flush operation is accomplished by closing valve 222 of effluent collector 208 and applying air, liquid, and/or air-liquid mix through back flush pipe 236 such that it travels through effluent chamber 202 and out of screen cartridges 204, thereby clearing screen cartridges 204 of obstructions. Sand cone flush pipe 82 (FIG. 1) can be used for the same purpose by injecting high pressure air, liquid, and/or air-liquid mix to clean the trapped fines and silt from sand cone chamber 230 and screen cartridges 204.

In the event the screen cartridges 204 become plugged with fine media particles (as evidenced by excessive head loss through filter unit 200), valve 222 is closed and high pressure liquid is injected into back flush pipe 236. Back flushing can be avoided altogether if the proper media is installed in filter unit 200, but unfortunately, the proper media is not always available at the filter installation site. The high pressure liquid goes down the effluent chamber 202 and out through the screen cartridges 204. Air can be used alone or with liquid to increase the scouring effect. The air/liquid combination can be useful if the media bed has been allowed to become fouled with biological matter.

The angular placement of screen cartridges 204 provides for lower cost installation due to not having to provide separate air vents to screen cartridges 204 and air back flush becomes more efficient. Significantly, the angular placement eliminates any flat top areas on screen cartridges 204 where media and soil can stagnate. The angular placement also provides for reverse (upward) flow out of the screen, which allows silt and fine media to settle to the bottom of the screen where they are trapped, allows the effluent to be cleaner because fine media and silt do not flow into the filtered fluid, and air is automatically purged from screen cartridges 204, i.e., screen cartridges 204 are self venting.

A reject outlet pipe 224 communicates washbox housing 206 with a reject box 218. An effluent collector 208 communicates the effluent chamber 220 with a location outside of the liquid filtering apparatus 288. The liquid filtering apparatus 288 is placed in a vessel or cone 294 having a bed of filtration material 16 and an intake 22 for introducing unfiltered liquid 20 into an upper region of the vessel 12 (FIG. 1) or cone 294 (FIG. 4).

Figure 5:
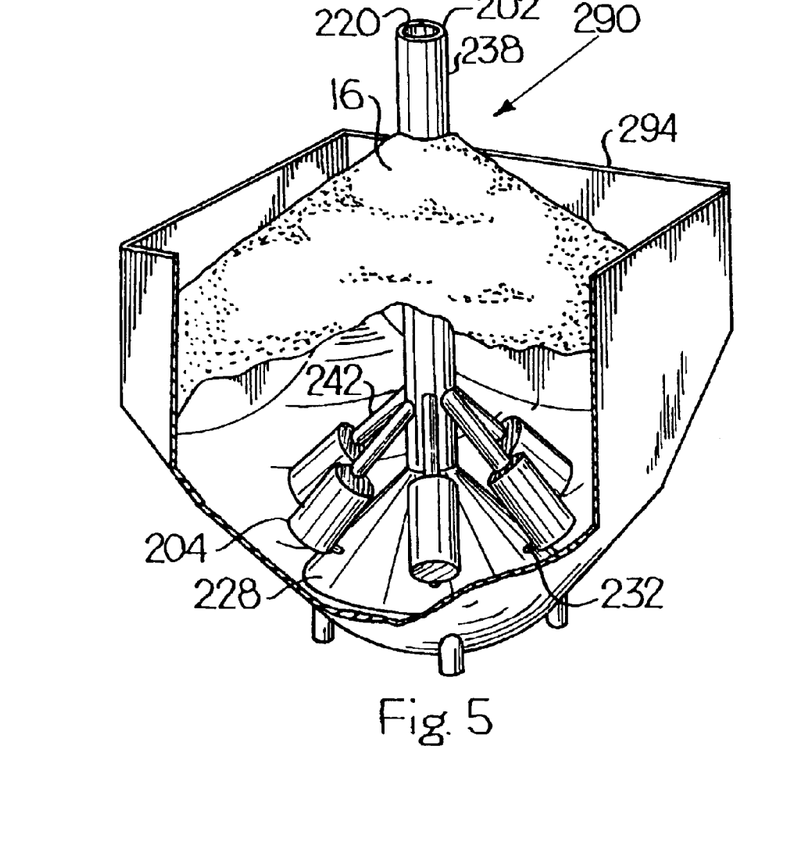
FIG. 5 is a perspective isolation view of a filter assembly according to a third embodiment of the present invention.

In a third embodiment of the present invention, the present liquid filtering apparatus is used for "in-ground" installations, typically in new or existing concrete basins. This embodiment avoids the difficulty of piping the effluent out of the basin at a low level. This embodiment avoids designs that require the effluent to be removed via a pipe that exits through a side wall of the vessel. Such a design is particularly inconvenient in a poured concrete tank, especially if the concrete is an existing installation being converted to a vertical flow moving bed sand filter. As shown in FIG. 5, this embodiment solves the effluent exit problem by bringing the effluent up through the center of a filter assembly 290 by means of concentric pipes, effluent riser pipe 238, and central pipe 220. The effluent passes upward and out of filter assembly 290 in effluent chamber 202, formed in the annulus between central pipe 220 and effluent riser pipe 238. Effluent chamber 220 is fluidly connected to screen cartridges 204 by way of cartridge connector 204.

Additionally, in this embodiment, by laying screen cartridges 204 down at an angle as described above, the maximum depth of filter media 16 is reduced. The lower filter media depth has the multiple benefit of having a lower hydraulic profile, lower cost for installation, and improved performance by having screen cartridges 204 at a lower point in the filter bed. Typically, it is desirable that there be a depth above screen cartridges 204 of at least 40 inches (102 cm). With screen cartridges 204 laying down at an angle, as described above, screen cartridges 204 will be approximately parallel to the surface of the media bed 16 providing a maximum vertical depth of 40 inches (102 cm) measured from the top of the screen. In prior art filter screen arrangements, a greater depth, as much as 6 feet (1.8 m) to the bottom of the screen is encountered. In this embodiment of the present invention, screen cartridges 204 have approximately the same depth of filter media 16 above them at all points. This situation reduces the hydraulic profile and makes it easier to plan the installation of the filter. Also, there is less provision required to accommodate the existing level of the liquid to flow into and out of the filter without pumping.

Figure 6:
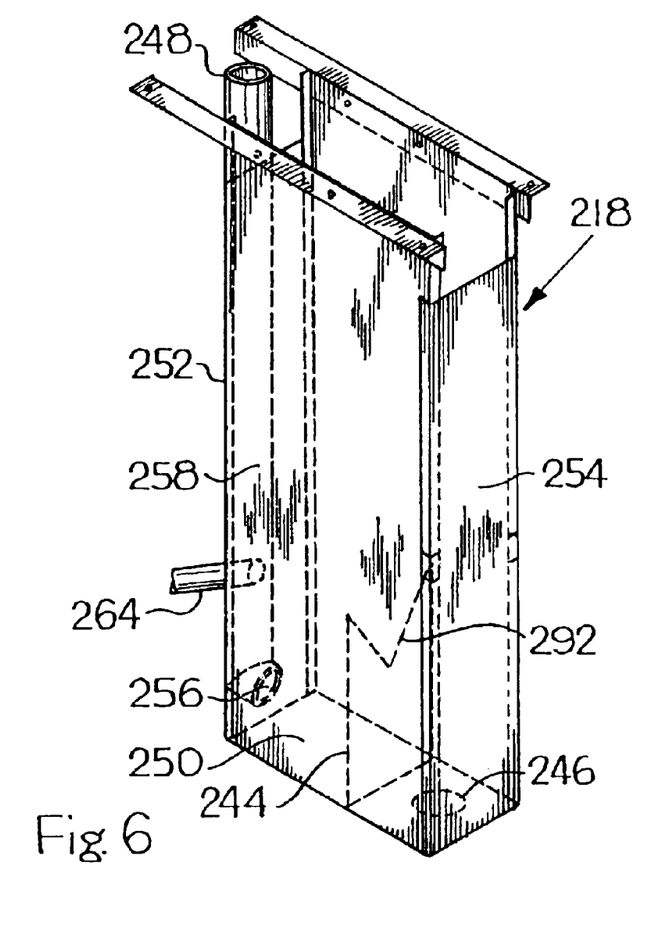
FIG. 6 is a perspective isolation view of a reject box of the present invention.

Returning to FIG. 4, the wash liquid discharges out of washbox housing 206 via reject outlet pipe 224 to a reject box 218. A valve 210 on reject outlet pipe 224 may be used to adjust the flow rate of the wash liquid into reject box 218. This may be used to conserve washing liquid that will have to be recycled through the filter plant. Reject outlet pipe 224 fluidly connects with reject line inlet 264, which allows wash liquid to enter reject box 218, as shown in FIG. 6. As shown in FIG. 6, reject box 218 has a weir volume space 258 defined by a bottom 250, a riser side 252, and a weir plate 244. Reject box 218 also includes an outlet side 254. The height of weir plate 244 may be adjusted to vary the volume of weir volume space 258. Weir plate 244 may include a V-shaped notch 292 along a top side. V-shaped notch 292 acts to regulate and gauge the flow of wash liquid out of weir volume space 258. The flow of wash liquid is the reject flow rate. Once wash liquid passes over weir plate 244, it exits reject box 218 by way of outlet 246 and is carried away by reject outlet line 260 as shown in FIG. 4.

Reject box 218 includes a vertical pipe 248, which communicates with weir volume space 258 by way of riser outlet 256. Vertical pipe 248 is used to gauge the liquid level in washbox 42, upstream from the V-shaped notch 292 in weir plate 244. Typically, a float is located inside vertical pipe 248. A stick may be attached to the top of the float, the stick extending up to an operator's platform. A scale on the stick indicates a flow rate reading.

Liquid, typically water or waste water, may be filtered using the present liquid filtering apparatus. In order to filter liquid, a bed of filtration material, usually sand, comprising particles of different sizes, including large particles and fine particles, is provided within a vessel. The bed typically has a general conical configuration. An unfiltered liquid, typically water or wastewater, is introduced above the bed and is filtered through the bed in a generally downward direction. The filtered liquid passes through multi-cartridge screens oriented in a generally angular downward direction, as described above, and into an effluent chamber, as described above, to form a collection of filtered liquid. The collection of filtered liquid is removed from the effluent chamber by way of an effluent collector, the flow through which is controlled by a telescoping valve as discussed above.

A mixture of filtered liquid and dirtied filtration material is withdrawn from a lower region of the bed and transported with a portion of the filtered liquid from a position in the lower region of the bed to a position above the bed. The dirt and filtration material are separated from each other by deflecting the dirtied filtration material and filtered liquid off of a filter media shield hood. Optionally, after deflecting the dirtied filtration material and filtered liquid off of the filter media shield hood, the filtration material is collected on a porous surface, such as a wedge wire or metal wire mesh screen cone. The dirt laden filtered liquid is transported through the porous surface, and the screened liquid is collected in a reject liquid collection tray.

The filtration material is washed by introducing a portion of unfiltered liquid at the bottom side of the washbox skirt in a counter-current manner, transporting the unfiltered liquid, now wash liquid, through the filtration material in the washbox skirt. The wash liquid is transported to a dirtied liquid reject box, the flow through which is regulated by use of a throttling valve. The wash liquid is discharged from the dirtied liquid reject box. The clean filtration material is deposited on the top of the bed so as to maintain the generally conical configuration.

Figure 7:
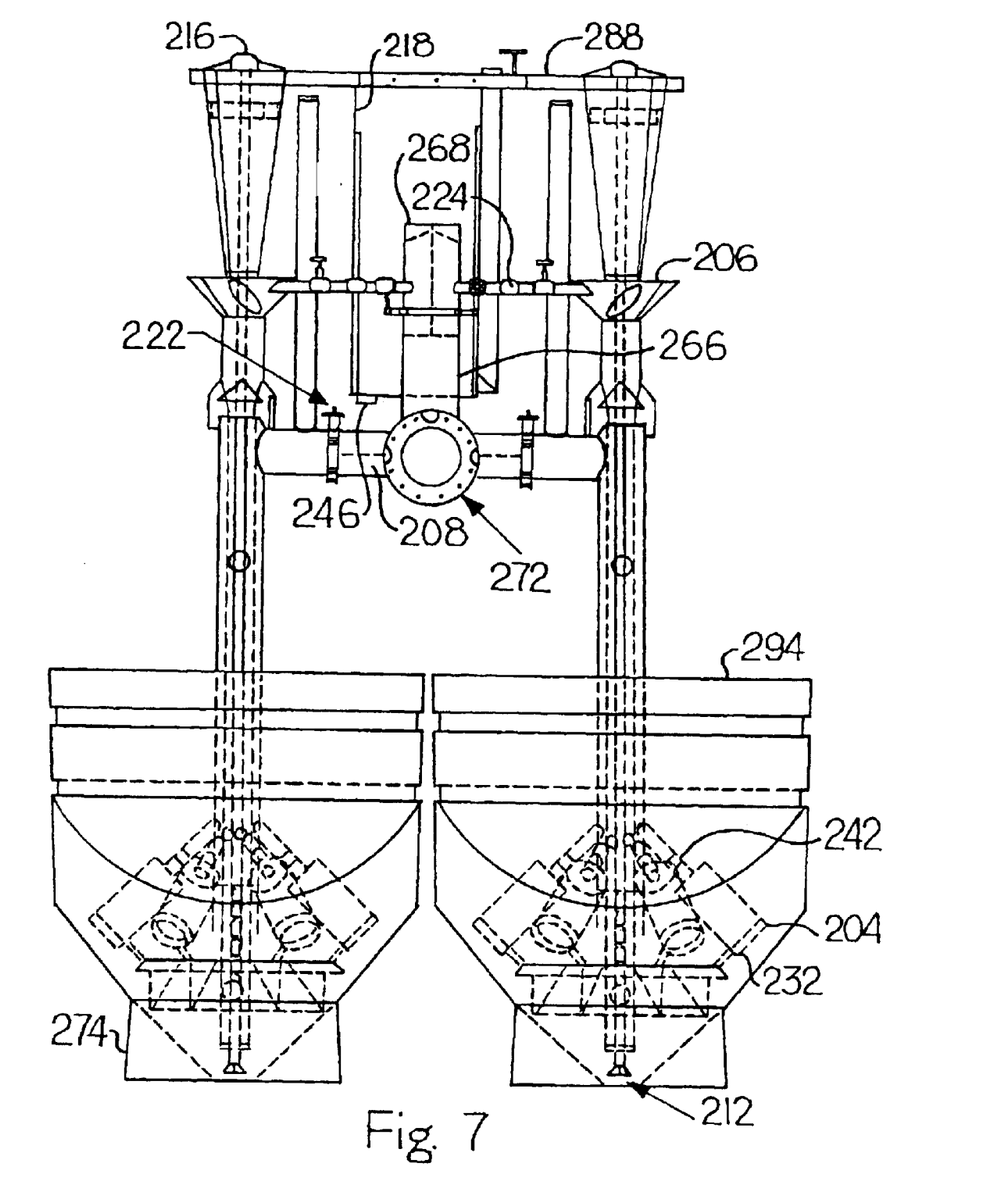
FIG. 7 is a front schematic elevation view according to a fourth embodiment of the present invention showing internal components.
Figure 8:
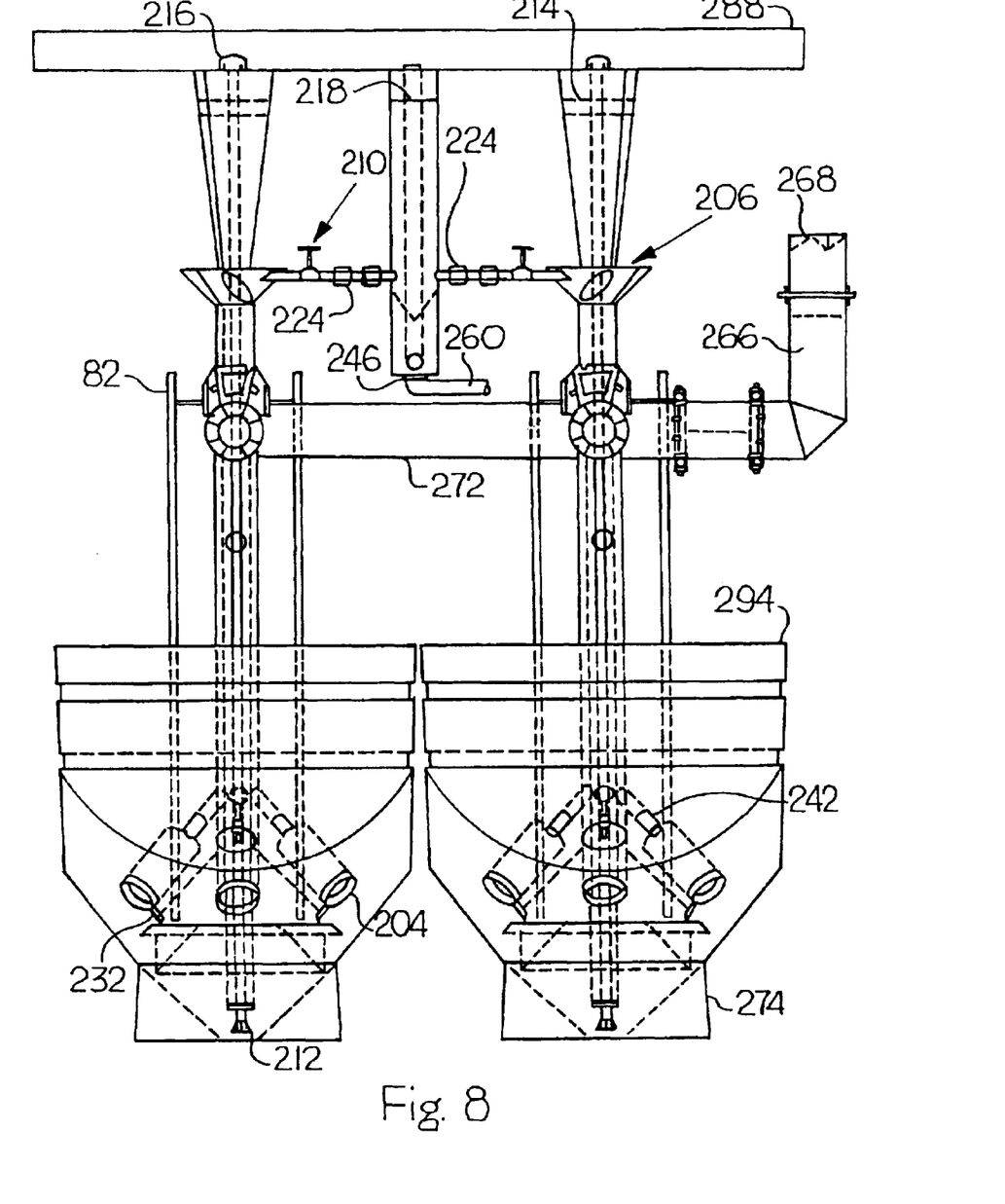
FIG. 8 is a side schematic elevation view according to the fourth embodiment of the present invention showing internal components.

In a fourth embodiment of the present invention, as shown in FIGS. 7 and 8, a liquid filter assembly may include two or more liquid filtering apparatuses 288. In this embodiment, a reject outlet pipe 260 extends from outlet 246 of each of the respective reject boxes 218 to a common reject manifold. Similarly, each effluent collector 208 connects to a common effluent manifold 272, which connects to an exit riser pipe 266. The effluent flow rate in each liquid filtering apparatus 288 is controlled by a single telescoping valve 268. All of the filtered liquid passes through telescoping valve 268. Exit riser pipe 266 will be as long as necessary to reach from the level of effluent manifold 272 to the top of liquid filtering apparatus 288. The filtered liquid flows out of the top of telescoping valve 268 and then flows away from the filter plant. The top of telescoping valve 268 is raised to decrease the flow rate through liquid filtering apparatus 288 and lowered to increase the flow rate through the liquid filtering apparatus 288.

When the filtered liquid leaves telescoping valve 268, it will typically be allowed to flow into an open channel where it is directed to the next step of a purification process, which may be, for example, water chlorination/disinfection prior to returning the filtered water to a natural waterway.

The present invention has been described with reference to the preferred embodiments. Obvious modifications and alterations will occur to others upon reading and understanding the preceding detailed description. It is intended that the invention be construed as including all such modifications and alterations insofar as they come within the scope of appended claims or the equivalents thereof.

We claim:

1. A liquid filtering apparatus comprising:
    a washbox;
    an airlifting tube, extending from the washbox, comprising:
        an expulsion end within the washbox; and
        an intake at a lower end opposite from the washbox;
    a central pipe extending along an outside surface of the airlifting tube from a position just below the washbox to a position just above the intake end;
    an effluent riser pipe extending along an outside surface of the central pipe from a position just below the washbox to a position above the intake end;
    an effluent chamber defined by the outer surface of the central pipe, a bottom plate of the effluent riser pipe, an upper plate of the effluent riser pipe, and an inner surface of the effluent riser pipe;
    at least one screen cartridge in communication with a lower portion of the effluent chamber, the screen cartridge oriented in a generally angular downward direction;
    a reject outlet pipe communicating the washbox with a reject box; and
    an effluent collector communicating the effluent chamber with a location outside of the liquid filtering apparatus.

2. The liquid filtering apparatus according to claim 1, wherein the liquid filtering apparatus is placed in a vessel having a bed of filtration material and an intake for introducing unfiltered liquid into an upper region of the vessel.

3. The liquid filtering apparatus according to claim 2, wherein the filtration material is selected from the group consisting of sand, anthracite, ceramic beads and granular activated carbon.

4. The liquid filtering apparatus of claim 2, wherein the liquid is water or wastewater.

5. The liquid filtering apparatus of claim 2, wherein the effluent collector is positioned above the vessel.

6. The liquid filtering apparatus of claim 2, wherein the vessel is an existing basin with no installed piping, the liquid filtering apparatus is retrofitted to the existing basin, and no holes are cored into the existing basin.

7. The liquid filtering apparatus of claim 2, wherein the depth of the filtration material above the screen cartridge is at least 40 inches (102 cm).

8. The liquid filtering apparatus of claim 1, wherein the intake at the lower end of the airlifting tube is a hollow bell-bottom shape.

9. The liquid filtering apparatus of claim 1, wherein the washbox comprises a filter media shield hood attached to an upper portion of the washbox, above the expulsion end of the airlifting tube, a washbox skirt below the filter media shield hood, a washbox isolator at the bottom of the washbox skirt, and at least one inlet tube at a bottom portion of the washbox skirt.

10. The liquid filtering apparatus of claim 9, wherein the washbox further comprises a target plate below the filter media shield hood and above the washbox skirt.

11. The liquid filtering apparatus of claim 9, wherein the filter media shield hood is an airlift return cap.

12. The liquid filtering apparatus of claim 9, wherein the washbox further comprises a porous separation cone below the filter media shield, a dirtied liquid reject collection tray below the separation cone, and a second reject outlet pipe communicating the dirtied liquid reject collection tray with the reject box.

13. The liquid filtering apparatus of claim 1, wherein the reject outlet pipe includes at least one valve.

14. The liquid filtering apparatus of claim 1, wherein the effluent collector includes at least one valve.

15. The liquid filtering apparatus of claim 14, further comprising a back flush pipe extending from the effluent collector at a point between the effluent chamber and the valve to a point above the washbox skirt.

16. The liquid filtering apparatus of claim 14, wherein said at least one valve is a telescoping valve.

17. The liquid filtering apparatus of claim 1, wherein the reject box comprises a weir volume space defined by a bottom side, a riser side and a weir plate, an outlet side comprising an outlet, and a vertical pipe communicating with the weir volume space by way of a riser outlet.

18. The liquid filtering apparatus of claim 17, wherein the height of the weir plate may be adjusted to vary the volume of the weir volume space.

19. The liquid filtering apparatus of claim 18, wherein the weir plate comprises a V-shaped notch along a top side of the weir plate.

20. The liquid filtering apparatus of claim 17, further comprising a pipe extending from the outlet of the reject box to a reject manifold.

21. The liquid filtering apparatus of claim 1, wherein the airlifting tube is disposed in a generally centered position within the central pipe by way of one or more internal guide vanes.

22. The liquid filtering apparatus of claim 1, wherein the screen cartridge is fluidly connected to the effluent chamber by way of a cartridge connector.

23. The liquid filtering apparatus of claim 1, wherein the screen cartridge forms an angle with the effluent riser pipe.

24. The liquid filtering apparatus of claim 23, wherein the angle is less than 90°.

25. The liquid filtering apparatus of claim 1, further comprising a sand cone attached to the bottom plate of the effluent riser pipe and terminating above the intake end of the airlifting tube, the sand cone having a sand cone space defined by the bottom plate of the effluent riser pipe, an inner surface of the sand cone, a sand cone bottom plate, and the outer surface of the central pipe.

26. The liquid filtering apparatus of claim 25, further comprising silt tubes connecting a bottom portion of the at least one screen cartridge to the sand cone space.

27. The liquid filtering apparatus of claim 25, further comprising a sand cone flush tube extending from the sand cone space to an area above the effluent collector.

28. The liquid filtering apparatus of claim 1, wherein the effluent collector is connected to an effluent header.

29. A liquid filter assembly comprising two or more of the liquid filtering apparatus of claim 1, wherein a reject outlet pipe extends from the outlet of each of the respective reject boxes to a common reject manifold and each of the effluent collectors connects to a common effluent manifold.

* * * * *